US011915541B2

(12) United States Patent
Anderson et al.

(10) Patent No.: US 11,915,541 B2
(45) Date of Patent: Feb. 27, 2024

(54) DISPLAY DEVICE FOR A GAMING MACHINE

(71) Applicant: Aristocrat Technologies Australia Pty Limited, North Ryde (AU)

(72) Inventors: Philip Jeffery Anderson, Las Vegas, NV (US); Linn Anthony McKay, Henderson, NV (US); Scott Monroe Stewart, Las Vegas, NV (US); Anthony Wayne Bond, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 304 days.

(21) Appl. No.: 17/138,304

(22) Filed: Dec. 30, 2020

(65) Prior Publication Data

US 2021/0118257 A1 Apr. 22, 2021

Related U.S. Application Data

(63) Continuation of application No. 16/000,349, filed on Jun. 5, 2018, now Pat. No. 10,909,797, which is a (Continued)

(51) Int. Cl.
*G07F 17/32* (2006.01)

(52) U.S. Cl.
CPC .......... *G07F 17/32* (2013.01); *G07F 17/3211* (2013.01); *G07F 17/3216* (2013.01)

(58) Field of Classification Search
CPC ... G07F 17/32; G07F 17/3211; G07F 17/3216
See application file for complete search history.

(56) References Cited

U.S. PATENT DOCUMENTS 5,752,881 A 5/1998 Inoue
6,027,115 A 2/2000 Griswold (Continued)

FOREIGN PATENT DOCUMENTS

EP 0410789 1/1991
JP H1099483 4/1998

(Continued)

OTHER PUBLICATIONS

JP200611064 A, Machine translation, retrieved on Dec. 15, 2022 (Year: 2006).*

(Continued)

*Primary Examiner* — James S. McClellan
*Assistant Examiner* — Ross A Williams
(74) *Attorney, Agent, or Firm* — McAndrews, Held & Malloy, Ltd.

(57) ABSTRACT

A display, as for an electronic gaming machine, includes one or more rotatable mechanical reels including at least one variable displaying position at which the display may be varied. Content is displayed at the variable displaying position when the variable displaying position registers with the display. One or more reels can include a reel strip which includes at one location a pre-printed symbol and at another location a window. A video display can be arranged, configured and controlled by a processor to cast a display at the inside of the reel to impart light and video effects to pre-printed symbol locations or to cast video content through the reel strip window.

20 Claims, 7 Drawing Sheets

Related U.S. Application Data continuation of application No. 12/163,831, filed on Jun. 27, 2008, now Pat. No. 10,013,843.

(60) Provisional application No. 60/946,857, filed on Jun. 28, 2007.

(56) References Cited

U.S. PATENT DOCUMENTS

| | | | |
|---|---|---|---|
| 7,452,276 | B2 | 11/2008 | Loose |
| 2003/0157980 | A1 | 8/2003 | Loose |
| 2004/0038726 | A1 | 2/2004 | Inoue |
| 2004/0209682 | A1 | 10/2004 | Okada |
| 2004/0209683 | A1 | 10/2004 | Okada |
| 2005/0255907 | A1 | 11/2005 | Gauselmann |
| 2008/0096655 | A1 | 4/2008 | Rasmussen |

FOREIGN PATENT DOCUMENTS

| | | |
|---|---|---|
| JP | H10314370 | 12/1998 |
| JP | 2002191748 | 7/2002 |
| JP | 2006110064 | 4/2006 |
| JP | 4114676 | 11/2006 |
| JP | 2007061465 A | 3/2007 |

OTHER PUBLICATIONS

Nagano, Hiroyuki; JP2006-110064A, Machine Translation, pp. 1-30.
Australian Examiner's first report on application No. AU 2008202817, dated Mar. 1, 2010.
Australian Patent Examination Report No. 1, on application No. AU 2015200492, dated May 26, 2016.
Office Action dated Aug. 21, 2020 for U.S. Appl. No. 16/000,349 (pp. 1-7).
Corrected Notice of Allowance dated Oct. 6, 2020 for U.S. Appl. No. 16/000,349 (pp. 1-4).
Notice of Allowance dated Oct. 2, 2020 for U.S. Appl. No. 16/000,349 (pp. 1-7).

* cited by examiner

DISPLAY DEVICE FOR A GAMING MACHINE

RELATED APPLICATION(S)

This application is a continuation of U.S. application Ser. No. 16/000,349, filed on Jun. 5, 2018, entitled "Display Device for a Gaming Machine," which is a continuation of U.S. application Ser. No. 12/163,831, filed on Jun. 27, 2008, issued on Jul. 3, 2018, as U.S. Pat. No. 10,013,843, entitled "Display Device for a Gaming Machine," which claims priority to U.S. Provisional Patent Application No. 60/946,857, having a filing date of Jun. 28, 2007, entitled "A Display Device For A Gaming Machine," all which are hereby incorporated by reference herein in their entireties.

FIELD OF INVENTION

The invention relates to gaming machines and display devices.

BACKGROUND OF THE INVENTION

In the past gaming machines included a number of mechanical reels which were spring loaded and released to spin by the pulling of a handle. The reels randomly stopped to display their symbols and define one or more outcomes.

Today, some gaming machines are electromechanical in nature and have mechanical reels driven by stepper motors to rotate and stop in a controlled manner to display outcomes derived from symbol combinations displayed on reel strips that are located on the periphery of the mechanical reels. Because of the stepper motors, these types of games are often referred to stepper games. A drawback to current stepper games is that the symbols on the reel strips are fixed. That is, the symbols are printed on the reel strips and hence they can only be changed by changing the printed reel strips.

Other current gaming machines employ video displays in order to display virtual reels to a player of a game. However, such gaming machines do not have the aesthetics and player appeal of electromechanical gaming machines with the physical, spinning reels.

SUMMARY

In a first aspect there is disclosed a display device for a gaming machine comprising: support structure; display; and a mechanical reel having an outer periphery defining a plurality of symbol positions including at least one variable displaying position at which the display may be varied and, the mechanical reel mounted to the support structure for rotational movement relative to the display, wherein the display is operable to display content at the variable displaying position when the variable displaying position registers with the display.

In an embodiment, at least a part of the display is disposed within the mechanical reel.

In an embodiment, the entire display is disposed within the mechanical reel.

In an embodiment, the content is one or more of a symbol, an animation, and a video display.

In an embodiment, the display is selected from the group comprising a TFT, an OLED, and an LCD.

In another embodiment, the display includes a projector component. In an embodiment, the projector component projects directly to the variable displaying position. In an embodiment, the projector component projects to the variable displaying position via one or more reflectors.

In an embodiment, the variable displaying position is defined by an aperture in the mechanical reel.

In an embodiment, the variable displaying position is defined by a light transmissive portion in the mechanical reel. For example, a clear or translucent window.

In an embodiment, the mechanical reel comprises a plurality of variable displaying positions.

In an embodiment, the display device comprises a plurality of displays.

In another embodiment the support structure comprises a first support member to which the mechanical reel is mounted and a second support member to which the display is mounted.

In an embodiment, the display device comprises a stop mechanism arranged to stop the mechanical reel at a desired stop position.

In an embodiment, the display device comprises a driver to drive the reel for rotational positioning relative to the display.

In an embodiment, the driver comprises a stepper motor that drives the mechanical reel and a drive controller, such as a microprocessor, operable to stop the mechanical reel at a desired stop position.

In a second aspect, there is disclosed a display apparatus for a gaming machine comprising: one or more display devices, each comprising: a support structure; display; and a mechanical reel having an outer periphery defining a plurality of symbol positions including at least one variable displaying position at which the display may be varied, the mechanical reel mounted to the support structure for rotational movement relative to the display, wherein each display is operable to display content at the variable displaying position when the variable displaying position registers with a display.

In an embodiment, the apparatus comprises a plurality of display devices.

In an embodiment, the apparatus further comprises a reel controller for controlling the stopping position of each reel.

In an embodiment, the apparatus further comprises a display controller for controlling the symbol video content to be displayed by each display.

In a third aspect, the invention provides an electronic gaming machine comprising: gaming machine housing; and one or more display devices disposed in said gaming machine housing, each a support structure; a display mounted to the support structure; and a mechanical reel having an outer periphery defining a plurality of symbol positions including at least one variable displaying position at which the display may be varied, the mechanical display mounted to the support structure for rotational movement relative to the display, wherein each display is operable to display content at the variable displaying position when the variable displaying position is in register with the display window.

In an embodiment, the electronic gaming machine further comprises a reel controller for controlling the stopping position of each reel.

In an embodiment, the electronic gaming machine further comprises a display controller for controlling the content to be displayed by each display.

In an embodiment, the electronic gaming machine comprises a content selector for selecting content, such as a game symbol or symbols to be displayed by the display. In an embodiment, the content selector also selects the symbol or symbols to be displayed by the mechanical reel.

In a fourth aspect the invention provides a gaming device comprising: a cabinet; a computer processor; a plurality of reel assemblies, each including a reel and a motor coupled to the reel to drive the reel for rotation, each reel having a periphery, said processor controlling said motors to rotate and position said reels; at least one modifiable display in communication with a display processor to display content, the periphery of at least one reel configured to allow the display to be viewed through said periphery.

In an embodiment said window includes an opening which, when aligned with the display, allows the display to be viewed.

In an embodiment said window includes at least a translucent segment to provide for viewing the display therethrough.

In an embodiment said periphery of said reel includes a reel strip having at least one window and at least one symbol printed thereon.

In an embodiment the reel strip includes pre-printed symbols which can be backlit by the display with color or other effects when the symbol registers over the display.

In a fifth aspect the invention provides a reel assembly for a gaming device, said reel assembly comprising: a support structure; a reel mounted to the support structure for rotation, each reel having a periphery having at least one window; a motor adapted to drive the reel for rotation, said processor adapted to control the motor; at least one modifiable display positioned to display video content through the window.

In a sixth aspect of the invention there is provided a gaming device for play by a player which includes at least one reel mounted for rotation, the reel including a reel strip at its periphery which includes at one location a pre-printed symbol and at another location a window. The reel strip has an outer peripheral side and an inside. A video display is arranged, configured and controlled by a processor to cast a display at the inside of the reel to impart light and video effects to pre-printed symbol locations or to cast video content through the reel strip window.

DETAILED DESCRIPTION

Figure 1:
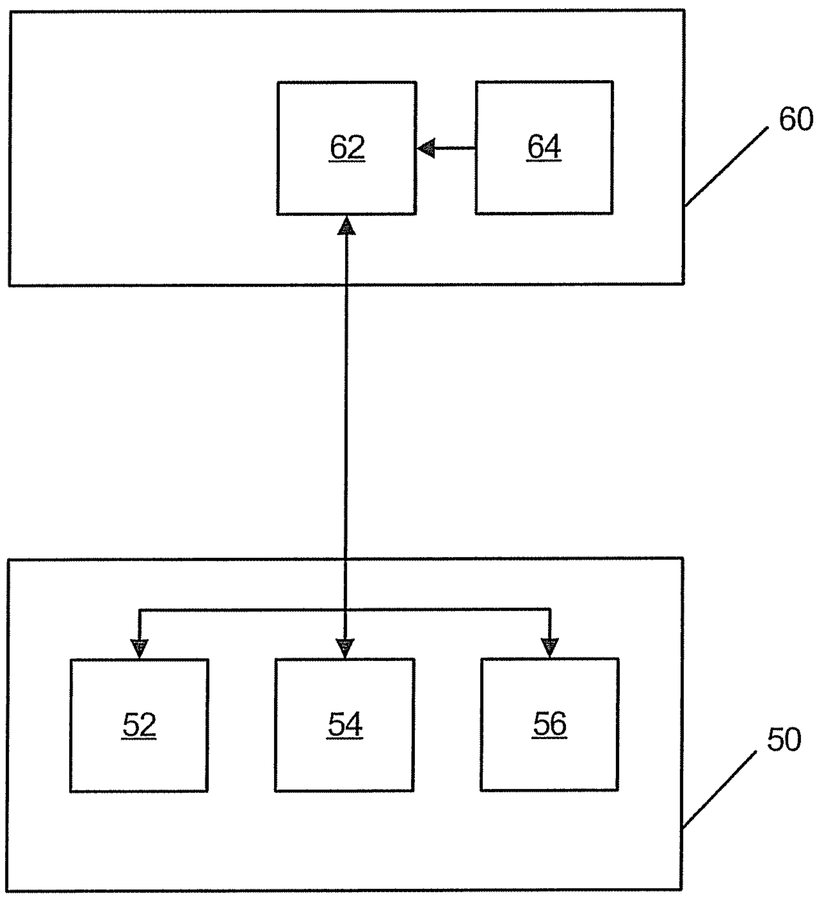
FIG. 1 is a block diagram illustrating components for a gaming machine.

Referring to the drawings, there is shown a gaming machine having a display apparatus that includes a plurality of mechanical reels each having at least one variable displaying position where a display may display a still image (such as a symbol), an animation (such as an animated symbol), video or other content. The display may additionally be used to impart visual effects at positions where there is a symbol. This gaming machine allows dynamic reel strips where the symbols of the variable displaying position can be changed (for example by being selected from a set of symbols) while retaining at least some of the game play experience of a mechanical reel machine.

A gaming machine comprises several functional components. At the broadest level, the components are a player interface 50 and a game controller 60 as illustrated in FIG. 1. The player interface is arranged to enable interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions. The credit mechanism 52 may be, for example, a bill acceptor which is configured to receive, validate and credit a cash amount to a credit meter for the game, as is known in the art. In certain embodiments at least one display of the gaming machine is provided by one or more display devices in the form of reel assemblies which include a mechanical reel and a display as described in further detail below.

The game controller 60 is in data communication with the player interface and typically includes a processor 62 that processes the game play instructions in accordance with game play rules and outputs game play outcome data to the display 54. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
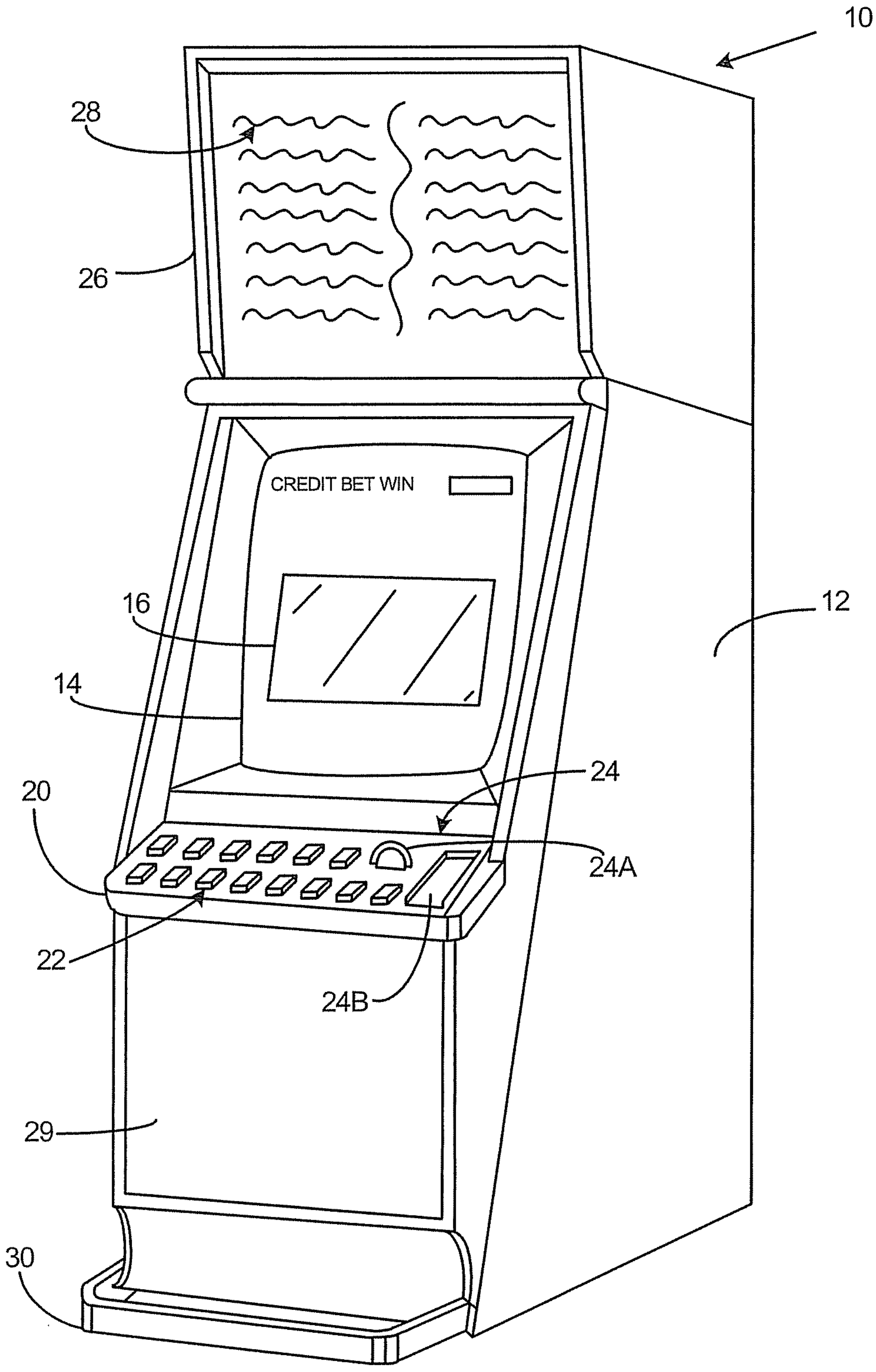
FIG. 2 is a perspective view of a gaming machine.

An example of the external physical form of a gaming machine 10 is illustrated in FIG. 2. The gaming machine 10 includes a housing in the form of cabinet 12 having a glass 14 with a viewing window 16 that enables the reels (not shown in FIG. 2) to be viewed. A mid-trim 20 of the gaming machine 10 houses an interface 50 embodied as a bank of buttons 22 for enabling a player to interact with the gaming machine, in particular during game play. The mid-trim 20 also houses a credit mechanism 52 shown as a credit input mechanism 24 which in this example includes a coin input chute 24A and a bill acceptor 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The top box 26 may also include an electronic display, for example a video display unit, particularly a cathode ray tube screen device. Alternatively, the top box display 26 may be a liquid crystal display, plasma screen, or any other suitable video display unit.

Figure 3:
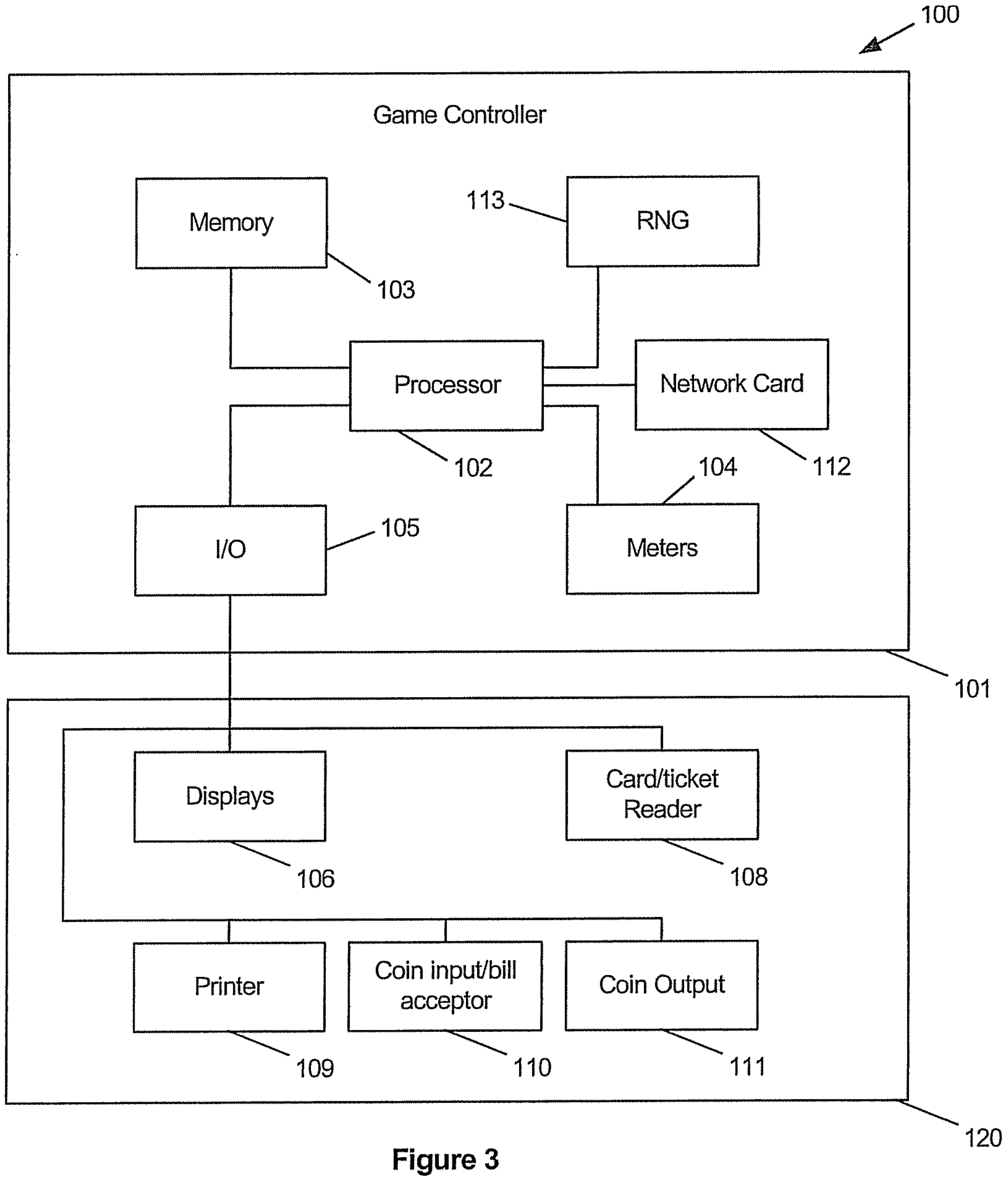
FIG. 3 is a block diagram of the operative components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card 112 may, for example, send status information, accounting information or other information to a central controller, server or database and receive data or commands from the central controller, server or database.

Figure 4:
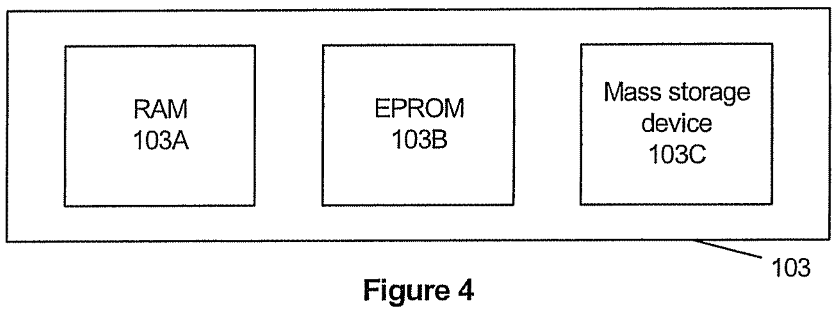
FIG. 4 is a block diagram of a memory of a gaming machine.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

As indicated above, certain embodiments employ display devices that are reel assemblies which combine a mechanical reel having a reel strip with a small electronic display arranged to display content at a variable displaying position of the mechanical reel, in one typical example by displaying a symbol through a window in the periphery that defines the variable displaying position. The mechanical reels are preferably driven by stepper motors which are well known in the art. The stepper motor allows the mechanical reel to be moved through a series of incrementally-spaced positions, e.g. 22 stops, and to be stopped at a desired position. In this way, the mechanical reel can be stopped at any one of a plurality of stop positions as determined by the processor 102. In the prior art, each of these stop positions corresponds to a symbol position. That is, a reel strip of printed symbols is affixed to the outer periphery of the reel. In most stepper machines of the prior art, a processor in combination with a random mechanism, such as a random number generator, randomly selects stop positions for each of plurality of reels (for example 3 to 5 reels) and the result is determined by the processor and random number generator based on these stopping positions. A variation on such a system is described in U.S. Pat. No. 4,448,419 to Telnaes where there is a virtual expansion of a reel by mapping at least some actual physical stop positions to more than one possible outcome thereby changing the odds of particular outcomes.

Figure 7:
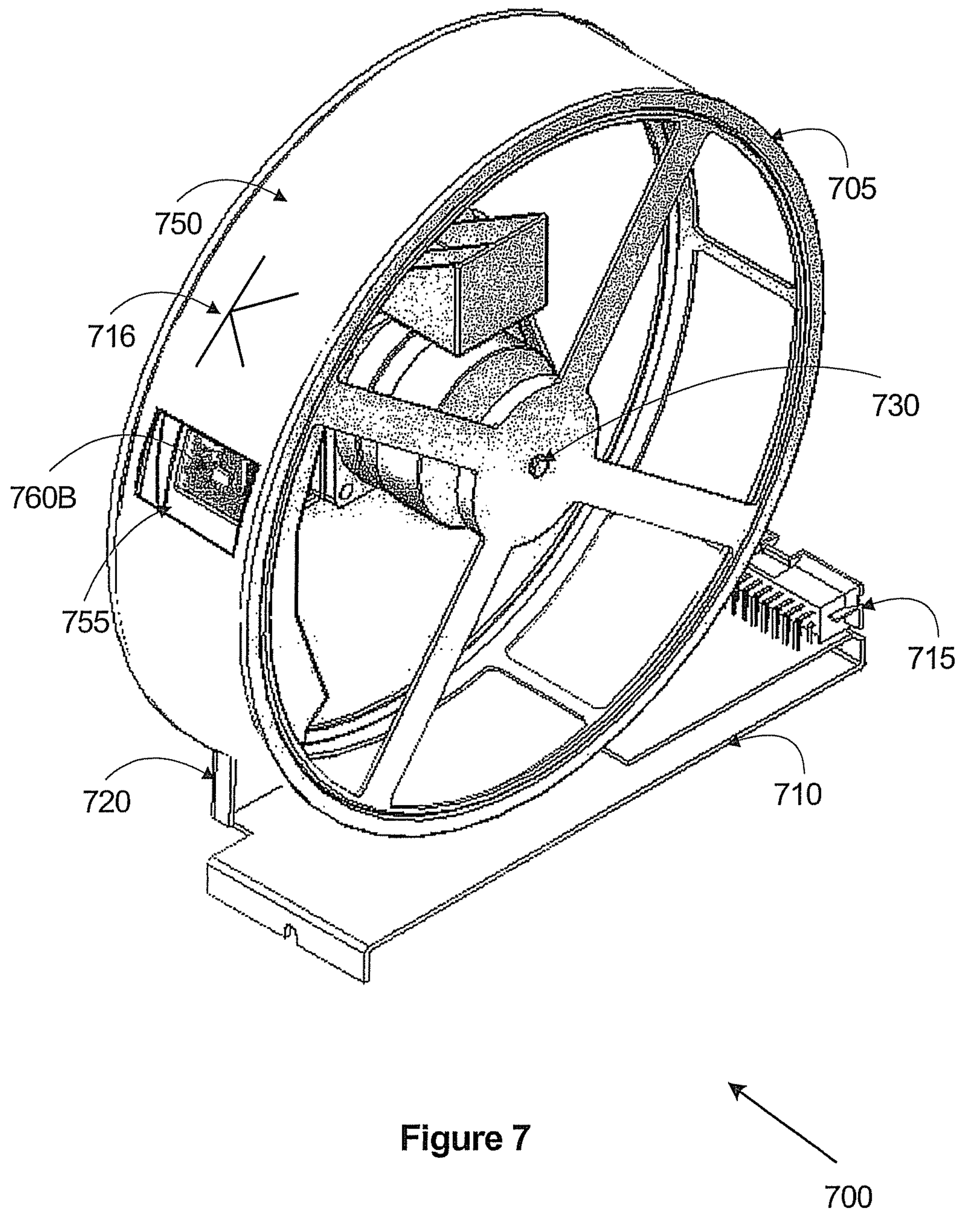
FIG. 7 is a perspective view of a display device of the preferred embodiment.
Figure 8:
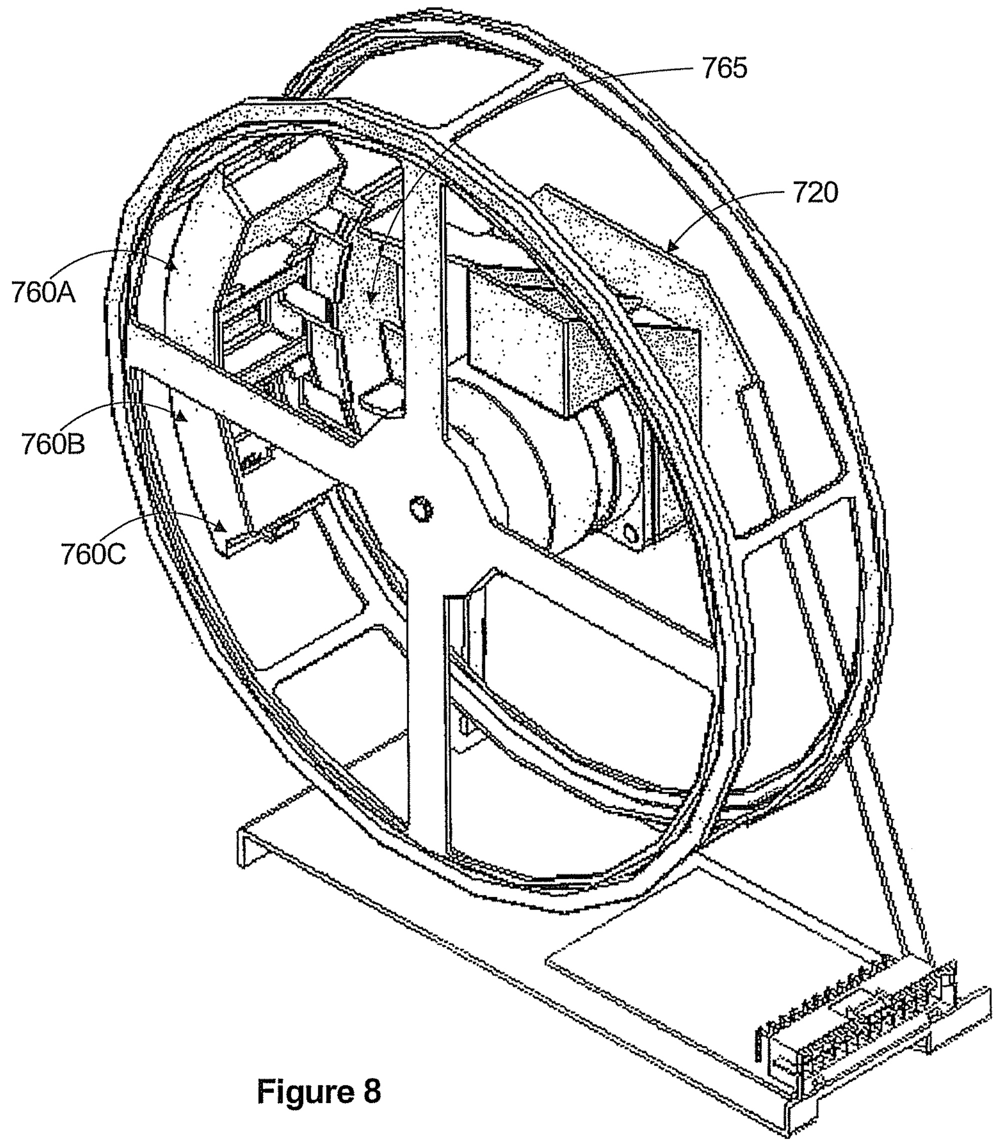
FIG. 8 is a reverse perspective view of the display device of FIG. 7.

Referring to FIGS. 7 and 8, there is shown an example of a display device embodied as a reel assembly 700. The reel assembly 700 includes a mechanical reel 705 mounted to a support structure comprising a lower support member 710 for mounting within the gaming machine and a side plate 720 which provides a further support member to which the reel 705 is mounted for rotational movement around axle 730. Power and control signals are supplied to the reel assembly 700 through electrical connectors 715. According to one embodiment, a set of symbols are disposed on the reel strip 750. The reel strip 750 may be a plastic velum printed with symbols, such as a “K” symbol 716 (FIG. 7). Symbols are separated by blank spaces on the reel strip 750. At one or more variable displaying positions, a window 755 is provided in the reel strip 750 and hence, in the outer periphery of the reel. The window 755 may be an opening through the reel strip 750 as it is in certain embodiments, or may be a transparent or translucent portion of the reel strip 750.

As shown in the drawings, within the periphery of the reel 705 is an arrangement of electronic video displays 760A-C supported and positioned to register with the window 755 when the window stops within the viewing window 16 of the machine 10. Thus, in certain embodiments, where the display 760A-C displays content in the form of a symbol, the variable displaying position or provided by window 755C and the other printed symbol positions 750 provide a set of symbol positions for the reel. Typically there will be 20 to 22 different symbol positions or “stops” on the reel. By providing the display 760A-C the effective number of symbols (or blanks) which can be presented during a game is not constrained by the number of reel stops. For example, where a display 760A-C is controlled to display an additional 20 symbols at one window 755, the reel strip has effectively 20 additional stop positions.

Typically at least one symbol position, such as, for example, 3 to 5 symbol positions will be viewable for each reel assembly 700 through the viewing window 16 shown in FIG. 2. Some or all of the symbol positions viewed by the player through window 16 define outcomes for the game. For example, with three reel assemblies, the particular game may have a single pay line. If the outcome of a spin of the reels 705 aligns one or more symbol(s) from each reel strip 750 on the pay line in a predetermined winning outcome combination, the player receives an award. Otherwise, the outcome is a losing outcome. Games may include more than one pay line which can be activated by the player and of course more than 3 reels 705. Where each reel assembly 700 has the arrangement of electronic displays 760A-C and one or more windows 755, additional symbols, video, colors and other video effects can be provided to the reels.

Each reel assembly 700 includes one or more peripherally arranged video displays 760A-C disposed, when viewed from a position of a person viewing the reel strip 750 through the viewing window 16, behind the reel strip 750 as depicted in FIGS. 7 and 8. Accordingly, the reel assembly 700 is arranged such that when the window 755 stops within the display window 16, the displays 760A-C can display selected content to the player. For example, and as shown in FIG. 7, if the reel 705 stops to align the window 755 over the display 760B, the processor 102 can control the display 760B to display, for example, an animated video symbol, one or more special symbols (for example as static symbol images), instructions, a video sequence or any other desired content. In conjunction with this example, displays 760A and 760C may be controlled to go dark or assume a desired backlighting color, flash and/or other effect to backlight one or more symbols printed on the reel strip 750.

The displays 760A-C may also be activated by the processor to flash or generate color during the rotation of the reel to enhance the viewing entertainment value. Flashing may be timed with the rotation of the reel 750 and the presentation of the symbols 749 or windows 755 over the displays 760A-C during rotation or may be timed differently. The video displays 760A-C or one or some of them may continuously or intermittently provide a color background to the symbols 749 or blanks of the reel strip 750. Displays 760A-C may also be controlled by the processor to flash or assume a color or other condition to highlight the symbols of winning combinations.

With reference to FIGS. 7 and 8 the displays 760A-C are LCD displays. In the embodiment depicted there are three LCD displays 760A, 760B, 760C mounted to the support structure by a flange 765 extending from the side plate. The displays 760A-C may be any other suitable type of display including OLED, TFT or the like. Further a single display (not shown) may be arranged to display at more than one display position, that is to substitute for two or more of the displays 760A-C. It should be understood that the reel assembly may include a single display, display 760B for example, aligned with a pay line for the game. Where there are three or more reel assemblies 700 for a game, some or all may include one or more displays 760A-C.

A person skilled in the art will appreciate that in a typical gaming machine there will be a plurality of reel assemblies 700 arranged next to one another in order to provide game outcomes. For example, a typical gaming machine will contain 3 to 5 reel assemblies 700. A person skilled in the art will appreciate that there are a number of variations that can be achieved. For example, there may be more than one window 755 on each reel strip 750. For example, there could be from one window 755 to several windows with the remainder of the symbols printed on the reel strip 750 to a window 755 at every symbol position on the reel strip 750. That is, the reel strip 750 may not include any symbols printed thereon and instead rely on the video displays 760A-C to display all symbols or other content to the player and to display images timed with the rotation of the reels to provide the desired visual effect of symbols rotating past the viewing window 16. The reel strip 750 may be configured to have different patterns of windows 755 and pre-printed symbols so that the reel 705 when stopped may present from none, one, two or three adjacent windows 755 over the video displays 760A-C. Thus, in this example, it will be possible to control the gaming machine so that sometimes one, sometimes two, and sometimes three windows 755 in the display window 16.

A number of variations are possible to the above embodiment. For example, while some of the aesthetics of a mechanical reel as provided by allowing several symbols to be seen on the reel surface during the spin. It is possible that the reel periphery may be composed entirely of windows such that all symbols become dynamic, in this case, the rotating mechanical reel periphery provides the aesthetics of rotation. Further, while most reels show three symbols in the display window at a time, this could be adjusted to another number such as two or four symbols. When a printed symbol is over a display, the display can act just as a white backlight, although other colors could be used for bonusing or special effects.

It is also possible to use other display technology. For example the video displays 760A-C may be embodied as reflectors (mirrors or prisms) with a projector focused to projects video content to the reflectors for reflection of the content through the windows 755. In a projector embodiment, some of a spin effect can be simulated by the projector. Where the projector is disposed to one side of the reel assemblies 700, the reel 705 may include spokes 800 positioned to interrupt the projected light to simulate the "flicker" of the spinning reel symbols.

It will be appreciated for the foregoing that the present invention provides a number of advantages including that some symbols of the game can be animated, more than one symbol can be displayed at any variable displaying position thereby changing the available game outcomes, symbols can be flashed in unison with the spinning reels to enhance the spinning sensation of the mechanical reel; and games or game themes can be changed through replacing/downloading new games or themes either dynamically via server based gaming or manually in order to modify the gaming machines. Further, as the device is mounted directly to the support the connections to the displays do not at involve complex wiring.

Figure 5:
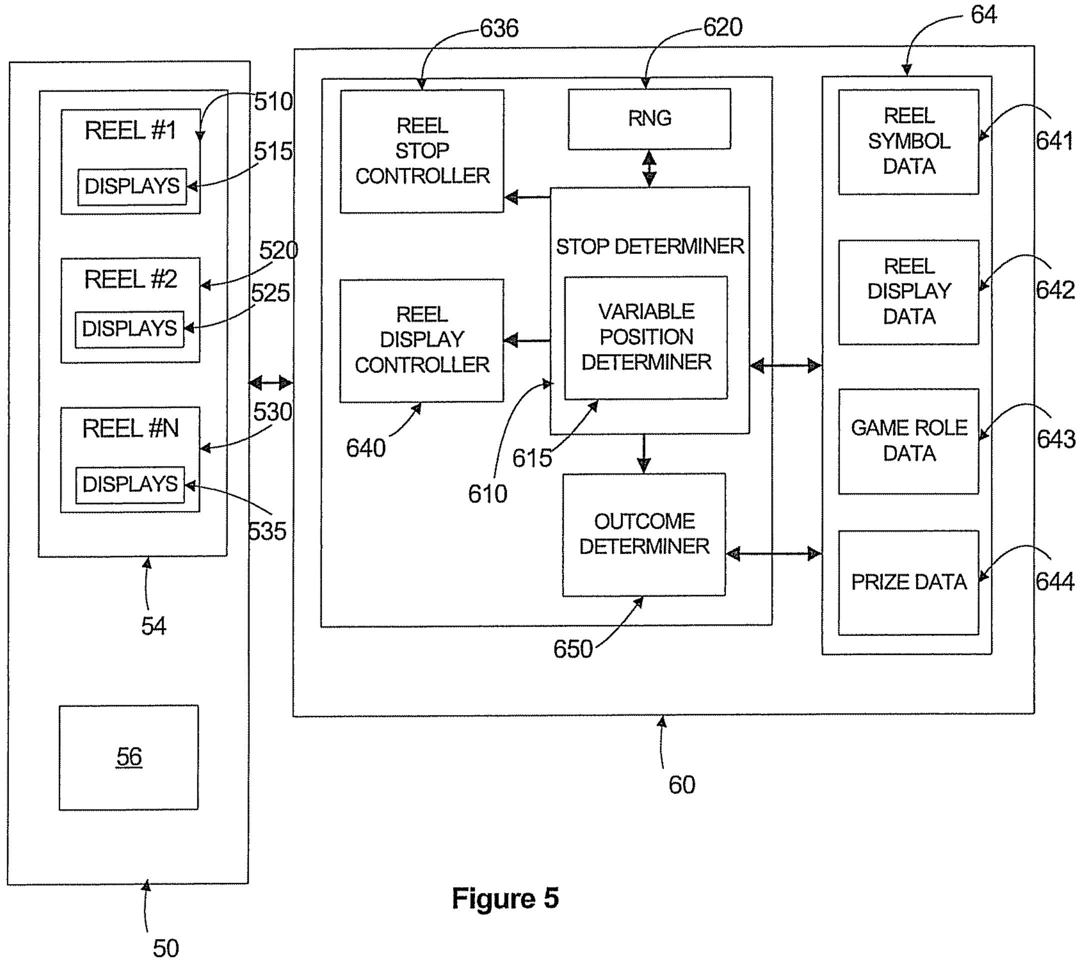
FIG. 5 is a block diagram of the functional components of a gaming machine of a preferred embodiment.

Referring to FIG. 5 there are shown the functional components of a player interface 50 and controller 60 of an embodiment. A person skilled in the art will appreciate that the functions will typically be implemented as software sub-functions executed on the process or 62. However, it is possible that the functions or a subset of the functions could be implemented as standalone hardware. For example the random number generator 620 could be implemented as a standalone hardware function.

In FIG. 5 there is shown a player interface 50 comprising a display 54 having a plurality of reels 510, 520 and 530. Each reel has a plurality of displays 515, 525, 535. The reels are in data communication with the controller. In this embodiment, a content selector is embodied by a stop determiner 610 which employs random number generator 620 to select stop positions for each of the reels 510, 520, 530 on the basis of reel symbol data 641 which includes reel display data 642. The stop determiner 610 includes a variable position determiner 615 which determines, based on display data 642, which symbol, video or other content should be displayed through the window 755. The stop determiner 610 sends data specifying the stop position of the reels to the reel stop controller 630 and the symbols to be displayed at the displays 515, 525, 535 to the display controller 640. The reel stop controller 630 controls each of the reels 510, 520, 530 to stop at the determined stop position and the in-reel display controller 640 controls the content displayed on each of the displays 515, 525, 535.

Figure 6:
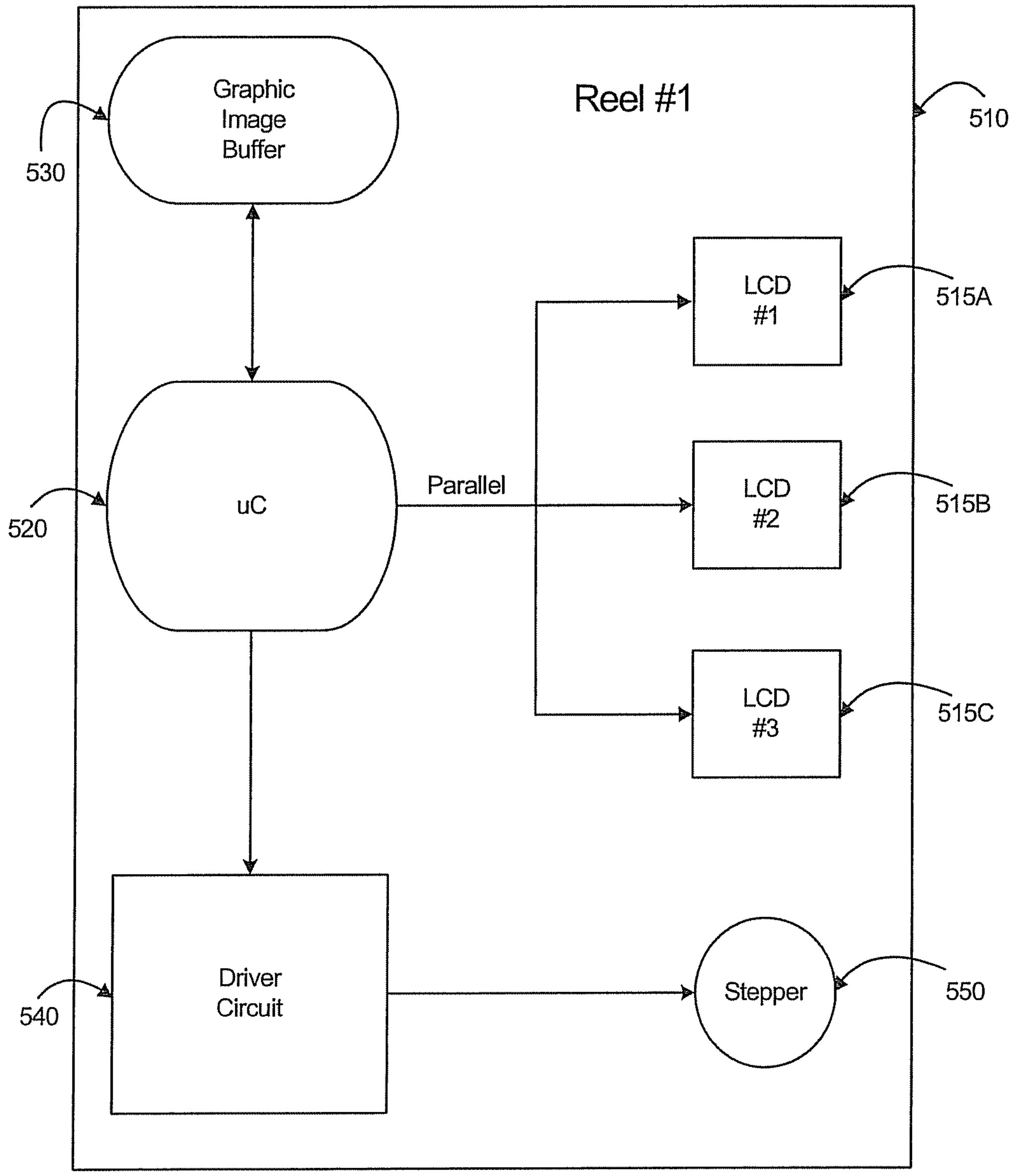
FIG. 6 is a block diagram of the components of a display device of the preferred embodiment.

FIG. 6 is a block diagram of a typical display device. As can be seen, in the first reel 510 has three small LCD displays 515A, 515B, 515C. A micro-controller 521 receives data from the processor as described above, graphics are buffered into a graphic image buffer 531 before being displayed on relevant ones of the displays 515 under control of the microcontroller 521. The microcontroller 521 also receives control signals for the stepper motor 550 which are applied by a driver circuit 540 in order to stop the reel at the correct position.

Further modifications will be apparent to persons skilled in the art as falling within the scope of the invention described herein.

What is claimed is:

1. A reel structure for a gaming machine comprising:

a video display; and a reel rotating about the video display in a rotational movement, and including a first plurality of symbol positions, the first plurality of symbol positions including a variable display position through which the video display is visible, the variable display position being located between a first position and a second position, wherein the video display is operable to i) impart light and video effects through the variable display position, ii) when the reel stops the rotational movement about the video display to register the variable display position with the video display, activate at different times a first portion of the video display to display one of a color and a backlight for the first position, a second portion of the video display to display a different one of the color and the backlight for the second position, and display a second plurality of symbols selected from a symbol set to visually add the second plurality of symbols to the first plurality of symbol positions, thereby lengthening the reel to increase an effective number of symbols on the reel, and, iii) during the rotational movement, intermittently and timed with the rotational movement, activate the video display to flash one of the color and the backlight.

2. The reel structure of claim 1, wherein the variable display position is a first variable display position, and wherein the reel comprises a plurality of variable display positions including the first variable display position.

3. The reel structure of claim 1, wherein the video display is a first video display, and further comprising a plurality of video displays including the first video display.

4. The reel structure of claim 1, wherein the video display comprises a video projector component operable to project directly through the variable display position on the reel.

5. The reel structure of claim 1, wherein the video display spans across at least two symbol positions of a plurality of symbol positions on the reel.

6. The reel structure of claim 1, wherein, when the variable display position is aligned with the video display, the video display to project one or more of an animated video symbol, a special symbol, an instruction, a video sequence, and video content.

7. The reel structure of claim 1, wherein the video display flashes the color that is timed with the rotational movement of the reel, a presentation of at least one of a symbol at a plurality of symbol positions, or the variable display position during the rotational movement.

8. A method for controlling a reel structure in a gaming machine having a game controller, a video display, and a reel enclosing the video display and including a first plurality of symbol positions, the first plurality of symbol positions including a variable display position through which the video display is visible, the variable display position being located between a first position and a second position, the method comprising:

controlling, via the game controller, the video display to impart light and video effects through the variable display position;

determining, via the game controller, a rotational movement of the reel;

controlling, via the game controller, the video display to display a second plurality of symbols selected from a symbol set to visually add the second plurality of symbols to the first plurality of symbol positions, thereby lengthening the reel to increase an effective number of symbols on the reel;

when the reel stops the rotational movement and registers the variable display position with the video display, generating, via the game controller, at different times a first portion of the video display one of a color and a backlight for the first position, and a second portion of the video display a different one of the color and the backlight for the second position; and when the reel is in the rotational movement, activating, via the game controller, the video display to flash one of the color and the backlight intermittently that is timed with the rotational movement.

9. The method of claim 8, wherein the variable display position is a first variable display position, and wherein the reel comprises a plurality of variable display positions including the first variable display position.

10. The method of claim 8, wherein the video display is a first video display, and further comprising a plurality of video displays including the first video display.

11. The method of claim 8, wherein the video display comprises a video projector component, further comprising projecting one of the color and the backlight directly through the variable display position on the reel.

12. The method of claim 8, wherein the video display spans across at least two symbol positions of a plurality of symbol positions on the reel.

13. The method of claim 8, further comprising, when the variable display position is aligned with the video display, displaying on the video display, one or more of an animated video symbol, a special symbol, an instruction, a video sequence, and video content.

14. The method of claim 8, further comprising flashing the color that is timed with the rotational movement of the reel, a presentation of at least one of a symbol at a plurality of symbol positions, or the variable display position during the rotational movement.

15. A non-transitory computer-readable medium comprising one or more sequences of instructions for conducting a game on a gaming system having a video display and a reel, the reel enclosing the video display and including a first plurality of symbol positions, the first plurality of symbol positions including a variable display position through which the video display is visible, the variable display position being located between a first position and a second position, and the one or more sequences of instructions, which, when executed, cause one or more processors to perform at least the steps of:

casting light and video effects through the variable display position via the video display;

determining that the reel is in a rotational movement about the video display;

controlling the video display to display a second plurality of symbols selected from a symbol set to visually add the second plurality of symbols to the first plurality of symbol positions, thereby lengthening the reel to increase an effective number of symbols on the reel;

when the reel is in the rotational movement, intermittently and timed with the rotational movement, flashing one of a color and a backlight;

determining that the reel stops rotational movement about the video display and that the variable display position is aligned with the video display; and when the reel stops the rotational movement about the video display and the variable display position is aligned with the video display, controlling at different times a first portion of the video display to display to display one of the color and the backlight for the first position, and a second portion of the video display to display a different one of the color and the backlight for the second position.

16. The non-transitory computer-readable medium of claim 15, wherein the variable display position is a first variable display position, and wherein the reel comprises a plurality of variable display positions including the first variable display position.

17. The non-transitory computer-readable medium of claim 15, wherein the video display is a first video display, and further comprising a plurality of video displays including the first video display.

18. The non-transitory computer-readable medium of claim 15, wherein the video display comprises a video projector component, and the one or more sequences of instructions, when executed, further cause a video projection of one of the color and the backlight directly through the variable display position on the reel.

19. The non-transitory computer-readable medium of claim 15, wherein the video display spans across at least two symbol positions of a plurality of symbol positions on the reel.

20. The non-transitory computer-readable medium of claim 15, the one or more sequences of instructions, when executed, further cause, when the variable display position is aligned with the video display, displaying on the video display, one or more of an animated video symbol, a special symbol, a game instruction, a video sequence, and video content.

* * * * *